United States Patent [19]

Caprarese et al.

[11] Patent Number: 4,965,826
[45] Date of Patent: Oct. 23, 1990

[54] METHOD OF AND SYSTEM FOR SCRAMBLING/DESCRAMBLING SOUND

[75] Inventors: Vincent Caprarese, Bois Colombes; Didier Goguillon, Fourqueux, both of France

[73] Assignee: U.S. Philips Corporation, N.Y.

[21] Appl. No.: 288,060

[22] Filed: Dec. 20, 1988

[30] Foreign Application Priority Data

Dec. 23, 1987 [FR] France ............................ 87 18045

[51] Int. Cl.⁵ .............................................. H04K 1/00
[52] U.S. Cl. ........................................ 380/19; 380/20
[58] Field of Search ................................ 380/9, 19, 20

[56] References Cited

U.S. PATENT DOCUMENTS

| | | | |
|---|---|---|---|
| 2,200,559 | 5/1940 | Mitchell et al. | 380/9 |
| 4,628,358 | 12/1986 | Robbins | 380/19 |
| 4,636,853 | 1/1987 | Forbes et al. | 380/19 |
| 4,654,705 | 3/1987 | Forbes et al. | 380/19 |
| 4,679,235 | 7/1987 | Okada et al. | 380/19 |
| 4,817,144 | 3/1989 | Cirta et al. | 380/20 |

FOREIGN PATENT DOCUMENTS

| | | |
|---|---|---|
| 1907580 | 8/1970 | Fed. Rep. of Germany . |
| 2358784 | 2/1978 | France . |
| 842101 | 7/1960 | United Kingdom . |

Primary Examiner—Salvatore Cangialosi
Attorney, Agent, or Firm—Jack D. Slobod

[57] ABSTRACT

A method of and system for scrambling/descrambling audio transmission in which periods of silence in the sound to be transmitted are detected and utilized to trigger immediately changing the scrambling mode and for also transmitting a control signal to alert the receivers to the mode change. The scrambled sound signal is transmitted with a small decay with respect to the control signal which, in practice, may be provided by an intrinsic delay in the transmission circuits. In a TV transmission system, the control signal is advantageously transmitted in the video channel.

10 Claims, 2 Drawing Sheets

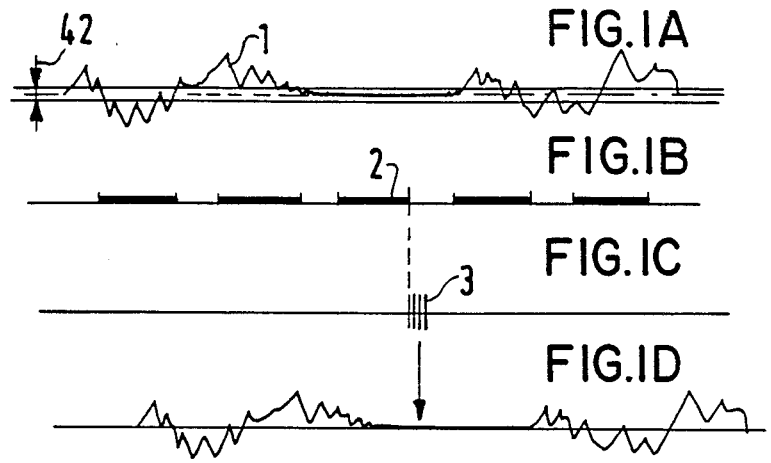
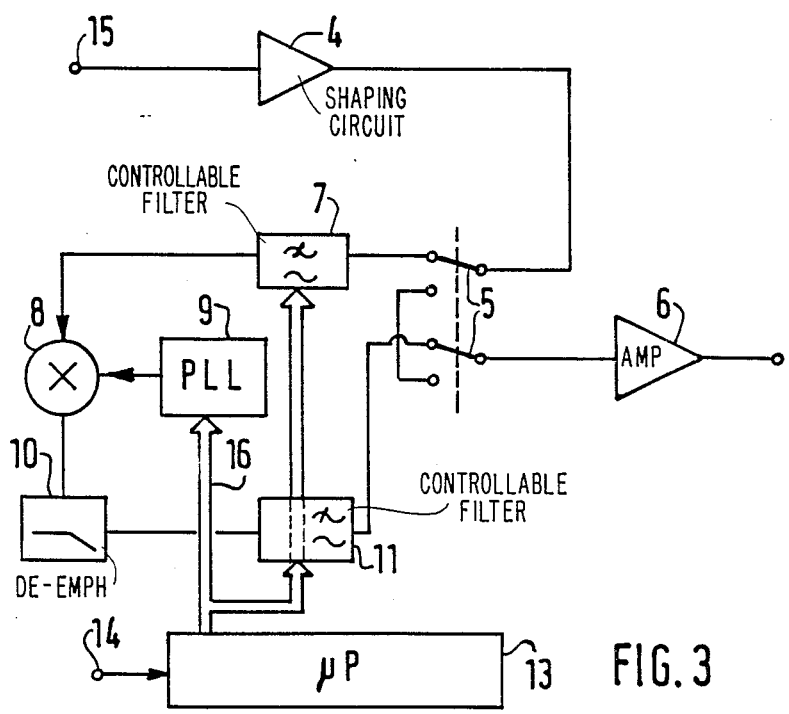

METHOD OF AND SYSTEM FOR SCRAMBLING/DESCRAMBLING SOUND

BACKGROUND OF THE INVENTION

1. Field of the Invention

The invention relates to a method of scrambling a sound signal applied to a transmission channel by providing several modes of alteration of the sound signal, the change-over from one mode to the other being triggered by a control signal, and a system for scrambling/descrambling the sound, comprising a sound signal source, a transmitter using a transmission channel and receivers, with a device at the transmitter end which is capable of altering the sound signal in several ways so that an unadapted receiver reproduces an unintelligible sound.

2. Description of the Prior Art

Sound scrambling is a process notably used in radio broadcasting or television broadcasting systems for the purpose of reserving the reception for a selected audience.

A sound scrambling method in a television system is known from the document DE-OS-1,907,580. According to this method three modes of sound transmission are provided: the normal mode in the unaltered baseband, a mode in which the band is shifted and not reversed, and a mode in which the band is shifted and reversed which can be realized by means of a modulator having a modulating frequency above the sound passband. The change-over from one mode to the other is controlled in this system at the instant of a field flyback in accordance with a pseudo-random process which is common for the sound and the image.

This method has the drawback that the mode changes may involve clicks in the sound because there is no correlation between the sound and the instants of changing the mode. Moreover, there are only two modes with an alteration which provides a limited protection of secret information.

SUMMARY OF THE INVENTION

It is an object of the invention to provide a method and a system which do not produce clicks during the mode changes and which give a high degree of protection by providing the possibility of using a large number of different modes.

The invention is based on the recognition that a change of the scrambling mode is only realized during the silent periods of the sound signal. But this poses a problem: when a silent period is detected, it is not known how long it is going to last and there should not be the risk that the change is triggered at the instant when the sound signal is resumed. This problem is solved by the method according to the invention which is characterized in that:

- periods of silence are detected in which the sound amplitude always remains below a reference value during a given period,
- the control signal is generated when such a period is detected,
- the sound is transmitted with a delay with respect to the initially applied sound and with respect to the control signal.

Instead of introducing a delay between the transmitted sound and the initial sound it is also possible to cut off the sound artificially during a short period which extends the above-mentioned period so that the change of the mode does not produce a click. Such a cut-off is not audible because of its short duration and particularly because it does not cut off the sound since it occurs at the start of a period of silence and thereby extends this period. A delay can also be introduced and at the same time the sound is interrupted.

In the case where the transmission path forms part of a television channel the search for said periods of silence is advantageously made once per field and the control signal is transmitted through the video channel.

An alteration mode which can be easily carried out and which is currently used is to modulate the sound in the baseband by means of a modulating signal whose frequency is such that the modulated signal is located in the transmitted frequency band. In this case a high number of different modes can be obtained, each mode corresponding to a different frequency of the modulating signal, among a plurality of given frequencies whilst the changes of these frequencies are advantageously controlled by the control signal according to the invention.

A system for carrying out the method according to the invention is characterized in that the transmitter comprises:

- comparison means for comparing the sound amplitude with a reference level,
- means for checking the output signal of the comparison means during a given period, which means generate a control signal transmitted through the transmission channel and applied to a processor which determines a digital control value indicating in which way the sound signal must be altered, and
- means which delay the sound signal in the transmission channel with respect to the said control signal.

In the case where the device which is capable of altering the sound signal is a modulation device comprising a modulating signal generator having such a frequency that the modulated signal is located in the band of transmitted frequencies, the modulating signal generator is programmable in frequency and the control value from the processor is a control value of the frequency of the modulating signal generator.

This generator is advantageously a phase-locked loop oscillator and the control value from the processor is a digital value which programs a divider of the generator.

In the case where the transit times in the transmission channel are not known it is advantageous to provide the system with a muting device which is capable of cutting off the sound on command and of activating this device during a short period immediately after the appearance of the control signal. In this case the existence of a delay may be superfluous.

Receivers according to the invention are provided with means for processing the transmitted control signal and for accordingly adapting the decoding mode so as to recover the initial sound. In the case where the alteration of the sound consists of modulating with a modulating signal the receiver comprises a sound signal modulator and a modulating signal generator which according to the invention is programmable in frequency and the receiver comprises means for detecting the control signal and a processor for calculating, under the control of the control signal, a signal for determining the frequency of the modulating signal generator.

BRIEF DESCRIPTION OF THE DRAWING

The invention will now be described in greater detail by way of example with reference to the accompanying drawings in which FIGS. 1A–1D are aligned time diagrams to illustrate the method FIG. 3 shows diagrammatically a part of a receiver according to the invention.

DETAILED DESCRIPTION OF THE PREFERRED EMBODIMENT

Figure 2:
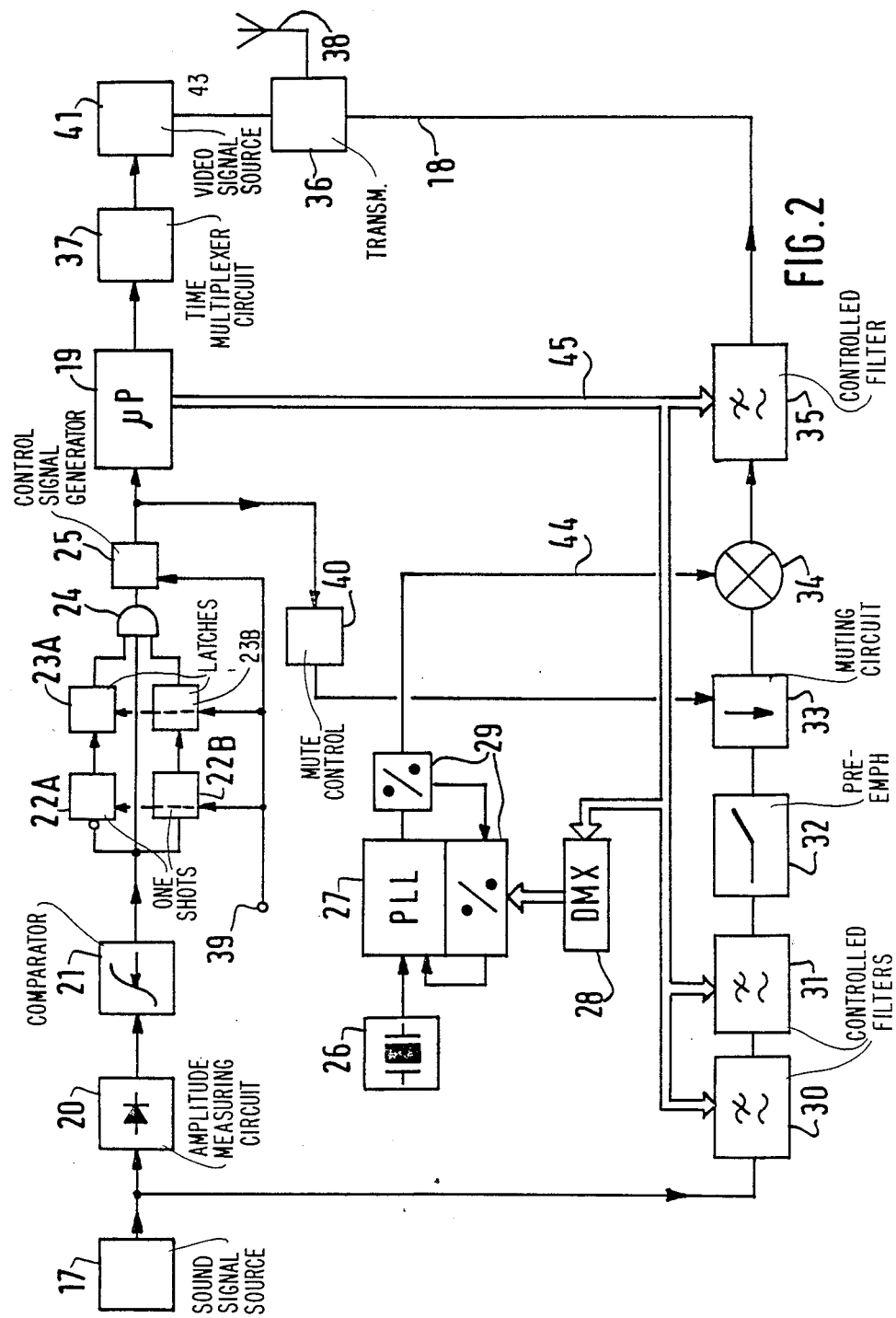
FIG. 2 shows diagrammatically a transmitter according to the invention

The embodiment of the method according to the invention which will be described applies to the scrambling of a sound signal in a television system which comprises a sound signal source, a transmitter using a transmission path and receivers. The method has been particularly developed in such a way that the essential parts of the required circuits are located at the transmitter end, thus simplifying the manufacture of the receivers.

The transmitter comprises a device for scrambling the image which does not form part of the present invention and a device for altering the sound signal in several ways. This is understood to mean that the way of altering the signal is not fixed once for all signals but may vary in the course of time. These variations are not continuous but consist of quasi-instantaneous passages from one scrambling mode to another, which passages are each time triggered by a control signal.

FIG. 1A shows a sound signal in the baseband. FIG. 1B shows by thickened lines, spaced apart sequential detection periods during which for each period it is detected if an event of silence takes place in said period characterized by the sound amplitude remaining throughout said period below a reference value indicated by the upper arrow 12 in FIG. 1A. Each of the indicated periods is fixed in duration, for example: ten to fifteen milliseconds. During the entire particular detection period indicated by the reference numeral 2, the amplitude of the sound signal is very small and in any case it is below the reference value, whilst during all the other periods shown the signal is above the reference value, at least at one instant. At the end of the period 2 the searched event has been detected and the control signal 3 shown on the line C is generated. As indicated hereinbefore, this signal triggers the passage from one scrambling mode to another in the transmitter. This signal is also instantaneously transmitted through the transmission channel so as to be processed by the receivers. The sound signal is transmitted as is shown in FIG. 10. It is the same signal as that on the line A but delayed with a delay which is of the order of one detection period shown in thickened lines in FIG. 1B. At the instant when the signal 3 is transmitted it appears that there is still a considerable period during which the signal shown on the line D still represents silence, i.e. a switch-over from one scrambling mode to another, simultaneously with the transmission and reception, can be made without producing audible clicks in the receivers. Such clicks are produced by non-linearity products with the incoming signal and are zero if this signal is zero.

The successive detection periods each of a given duration are, for example repeated once per field of a television picture. In other systems a permanent detection could easily be realized while transmitting a signal each time when a period of silence with a minimum duration of at least several milliseconds has appeared. In the present example the periodicity of the detection periods and their synchronism with the video part is used to advantage for transmitting the control signal 3 through the video channel. This signal may be introduced, for example on one of the lines during the flyback period at an instant which has a predetermined relationship with respect to the line and field synchronizing pulses so that it can be easily detected in the receivers. In order to transmit the signal immediately, the detection periods are shifted with respect to time so that they are exactly terminated at the instant for a possible signal.

In practice the complex circuits of a television transmitter introduce delays between the sound and the image, with the result that it is not necessary to specifically provide a delay device such as a delay line: by transmitting the control signal through the video channel it is avoided that the sound channel is disturbed and that different frequency bands must be used for the sound signal and the control signal as in the document referred to in the opening paragraph, but on the other hand it is of course achieved that the control signal is lying a while ahead of the sound signal.

In the case of, for example cable television transmission which does not have such a delay, a delay likne or any other arbitrary means for delaying the transmission of the sound with respect to the transmission of the control signal could be provided.

In the case where the natural transmission delay is weak or not constant or if the period of establishing a new scrambling mode is considerable, it may be advantageous to cut off the sound during a short period which extends the detected period of silence. This cut-off should be introduced in the sound under the control of signal 3, for example at a point in the device where the sound is not delayed.

A known means of scrambling the sound is to alter it by modulation in the baseband by means of a modulating signal whose frequency is such that the modulated signal is in the transmitted frequency band. This is the means which is used, for example in the French system known under the name of "Canal +".

If a modulating signal is used at a fixed frequency, it is very easy for an unauthorized person to decode. If on the other hand a modulating signal is used for which various predetermined frequencies are provided and whose frequency is often modified, it is much more difficult to decode. This modification of the frequency constitutes one of the possible processes with which several alteration modes of the sound signal can be obtained with each of these modes corresponding to one of the predetermined frequencies of the modulating signal. The change of frequency of the modulating signal is each time triggered by the control signal 3.

An example of a mode of the method according to the invention will now be described.

The television transmitter of FIG. 2 comprises a sound signal source denoted by the reference numeral 17 which may be a microphone, or a registration carrier with its control and calibrating circuits. Its also comprises a video signal source 41 such as a camera or a registration carrier and a transmitter 36 which multiplexes the video channels 43 and sound channels 18 in frequency before transmitting them through a transmission aerial 38. All these elements are shown for the situation of the circuits according to the invention, but are not part of them.

The sound signal is applied to comparison means 20, 21 and to the input of an encoding circuit 30-35 which will be described hereinafter and which provides at the connection 18 the signal to be transmitted by the transmitter 36.

The comparison means comprise an amplitude measuring circuit 20 which in practice is a full-wave rectifier realized by means of operational amplifiers and diodes and whose output voltage which represents the ampltitude of the sound signal is applied to a comparator 21 which compares it with a reference level which is easily created by means of, for example a divider bridge with a regular supply, which components are not shown. This reference level corresponds to the amplitude indicated by the arrow 42 in FIG. 1A. In practice it corresponds to a state of silence and is not quite zero because total silence would never be detected for reasons of background noise. A compromise must be made between a very low threshold which would seldom be achieved and a very high threshold which could lead to small clicks at the instant of changing the scrambling mode.

The output signal of comparator 21 thus indicates if the amplitude of the sound signal is larger or smaller than the reference voltage level. For example, this signal is supposed to be zero in the case of noise and 1 in the case of silence. This indication is permanent and instantaneous. Thus checking means are required which monitor this signal during a given period. These checking means are constituted by the circuits 22 to 25. The output signal of the comparator 21 is applied to the input of the two monostable circuits or one-shots 22A and 22B. The outputs of one-shots 22A, 22B, respectively feed the inputs of hold circuits or latches 23A. A signal composed of sequential signal elements which occur at the same times the detection periods indicated by thickened lines in FIG. 1B, is applied to the terminal 39 connected to the circuits 22, 23, 25. During each signal element the monostable circuits are enabled, i.e. rendered susceptible to be triggered as a function of the signal from the comparator 21. The circuit 22A is triggered whenever the output signal of the comparator makes a transition from 0 to 1 while the other circuit 22B is triggered at the inverse transition.

The outputs of circuits 22A, 22B are normally 1 and fall to 0 during a triggered pulse which has a duration at least equal to that of a detection period, such as 2 in FIG. 1B. The end of each signal element at the terminal 39 triggers the storage of the output signals of the monostable circuits 22A, 22B by the respective latches 22A, 22B and the two stored signals are applied to two inputs of a NAND gate 24. This gate has a third input which is directly connected to the output of the comparator 21.

If there has been a transition in one or the other direction at the output of the comparator during the detection period established by the signal element applied at terminal 39, this means that at least an instant during said detection period there has been no silence. One or the other monostable circuit is triggered and its output signal is 0 at the end of the checking period: at least one of the inputs of the gate 24 is not 1.

If the sound signal has always been higher than the threshold without any interruption during the detection period it remains higher at the end of the detection period causing the output signal of the comparator 21 to be 0 at that time. Because of the direct connection of the third input of the gate 24 to the output of the comparator this condition is also detected by gate 24.

If there has been a silence during the entire period, there has not been a transition and the outputs of the two monostable circuits are 1 and the output of the comparator 21 is 1. Other equivalent structures are feasible, for example with inverse logic levels, leading to the same result. The output of the gate 24 is connected to the control signal generator circuit 25 and ensures that this circuit can generate the control signal. This signal is transmitted to a processor 19 which controls a time-multiplexer circuit 37 introducing a code in a picture scanning line of the video signal generator 41 so as to be transmitted by the transmitter 36.

Under the control of the control signal the processor 19 determines a digital control value indicating in which manner the sound must be altered and it supplies this value on the multiple connection 45. In the example described this value determines which frequency must be chosen for the modulating signal. This value is determined, for example on the basis of an extension of the algorithm associating a pseudo-random generator, a transmitted code and a secret key and which is currently used for scrambling of the picture, for example in the "Canal +" System. This algorithm enables a processor located in the receivers to recover the same frequency as that chosen at the transmission under the only control of the transmitted control signal, this control signal only triggers the change of a frequency and it is the processor which decides which will be the new frequency.

The devices which is capable of altering the sound signal comprises the elements denoted by the reference numerals 26 to 35 and includes the, modulation device which comprises the modulator 34 and the modulating signal generator 26 to 29. The latter comprises a phase-locked loop osillator 27, referred to as PLL, which is controlled by a quartz oscillator 26. The supplied frequency is divided in a divider 29 one part of which presents a programmable division ratio which is controlled by a demultiplexer 28 to which the digital control value determined by processor 19 is applied via the multi-wire connection 45. The connection 44 applies the modulating signal to the modulator 34. A series of equidistant frequencies can be obtained with this device.

The generator 26–29 can supply, for example thirty-two equidistant frequencies between 12.0 kHz and 15.1 kHz. The minimum distance between two possible frequencies thus is 100 Hz and such a distance between the transmitter and the receiver provides a sufficient scrambling.

A fixed divider could also be used and its frequency could be divided in a variable ratio, but the series of frequencies obtained would not be equidistant.

The sound signal is applied in cascade to two successive filters 30, 31, a known pre-emphasis circuit 32, a muting circuit 33, the modulator 34, an output filter 35 and finally the transmitter 36. Each of the filters 30, 31, 35 is a seventh order switched capacitance filter which is commercially available as an integrated circuit and whose cut-off frequency may be electrically controlled by the digital value on the connection 45 or by the introduction of an external signal whose frequency controls the cut-off frequency of the filter.

In the present realization the intrinsic delays introduced by the circuits in the sound signal with respect to the video signal in the transmitter are sufficient for obtaiing the envisaged effect, i.e. the delay between the signals in FIGS. 1D and 1A. If this were not the case, a delay line could be provided, for example between the filter 35 and the transmission path. Another means may be used which may render the existence of a delay redundant: a mute control circuit 40 which may be a monostable circuit or a line counter is triggered by the control signal from the generator 25 and this circuit 40 determines a period during which it applies an activating signal to the muting circuit 33 which cuts off the sound when it is activated. This sound cut-off or mute may last for example one to two periods of the picture scanning line.

The decoding circuit of FIG. 3 arranged in a receiver of the system, for example a television receiver comprises a sound demodulator, which is known and not shown, applying the sound signal via an input terminal 15 to the input of a shaping circuit 4 for adjusting the level, or for limitation (or any other function not according to the invention) whose output signal is applied to a double switch 5 whose function can easily be understood: in the position shown, in which a scrambled sound is received, the sound passes via a first low-pass filter 7, a modulator 8, a de-emphasis circuit 10 and a second low-pass filter 11 and finally arrives at an output amplifier 6. In the other position of the switch 5, in which a clear transmitted sound is received, the sound reaches the amplifier 6 directly. A programmable PLL oscillator 9 applies a modulating signal to the modulator 8. This signal must present the same series of frequencies as those of the generator 27 of the transmitter. The transmitted control signal is detected in the video signal by suitable means and is applied via the terminal 14 to a processor 13 in which it triggers the same calculation as with the transmission for determining the frequency whose result is applied in the form of a control word through the connection 16 to the oscillator 9. This word has five bits in this case for defining 32 frequencies. It is also applied to the filters 7 and 11 for controlling their cut-off and/or rejection frequency. In principle the sound arriving at the filter 11 is always restored in its baseband by the modulator 8 and this filter 11 could thus be the same, independent of the frequency of the modulating signal. But is has a rejection function for the modulating frequency which is not fixed. The value provided by the processor thus controls the cut-off and refjection frequency of the filter 7 and only the rejection frequency for the filter 11.

The system described hereinbefore relates to several modes of scrambling based on a variable frequency for the modulating signal. It will be evident that the invention is applicable to all scrambling methods using several arbitrary modes.

What is claimed is:

1. A method of transmitting an output audio signal which is a scrambled version of an input audio signal by switching among a plurality of scrambling modes, said method comprising:
    producing said output audio signal by altering said input audio signal in accordance with a current scrambling mode,
    first transmitting said output audio signal over transmission channel means,
    searching for periods of silence in said input audio signal over sequential detection periods by decting when the amplitude of the input audio signal remains below a reference value throughout a said detection period,
    second transmitting a control signal over said transmission channel means in response to said detecting, and
    changing the current scrambling mode in response to said detecting,
    wherein said first transmitting is such that the transmitted output audio signal is delayed at least a predetermined time period with respect to the transmitted control signal or the output audio signal is muted during a said predetermined time period which immediately follows said detecting.

2. A method as claimed in claim 1, wherein said transmission channel means is a television transmission channel means comprising an audio channel and an associated video channel, said first transmitting being in said audio channel, characterized in that said periods of silence are searched for once per field of said channel.

3. A method as claimed in claim 2, characterized in that the said control signal is transmitted through the video channel.

4. A method as claimed in claim 1, wherein said transmission channel means has a transmitted audio frequency band and wherein in each scrambling mode the input audio signal is altered by modulating said input audio signal in the baseband by means of a modulating signal having a different predetermined frequency associated with said mode which is chosen such that the transmitted output audio is located in the transmitted audio frequency band.

5. A system for transmitting an output audio signal which is a scrambled version of an input audio signal by swtiching among a plurality of scrambling modes, comprising:
    comparison means for comparing the amplitude of the input audio signal with a reference level below which "silence" occurs and for forming an output signal indicating when said amplitude is below said reference level, *means for checking the output signal of the comparison means during a detection period to detect a sustained "silence" throughout said detection period, and for generating a control signal when said sustained "silence" is detected,
    means for transmitting said control signal through a transmission channel means,
    a processor fed by the control signal for changing a current scrambling mode in response to said control signal and for determining a digital control value indicating in which way the input audio signal must be altered in accordance with the current scrambling mode,
    means responsive to said digital control value for forming said output audio signal by altering said input audio signal and for transmitting said output audio signal in said transmission channel means, and ** means for delaying the transmitted output audio signal with respect to the transmitted control signal for at least a predetermined period or for muting said transmitted output audio signal for said predetermined period immediately after the appearance of said control signal.

6. A system as claimed in claim 5 wherein said transmission channel means has a transmitted audio frequency band and wherein said forming means comprises a modulation device for modulating said input audio signal with a modulating signal, and a modulating signal generator for generating said modulating signal to have such a frequency that the modulated signal is located in the transmitted audio frequency band, characterized in that the modulating signal generator is programmable in frequency and in that the control value from the processor indicates the frequency of the modulating signal to be generated.

7. A system as claimed in claim 6, characterized in that the modulating signal generator is a phase-locked loop oscillator including a frequency divider and in that the control value from the processor is a digital value which programs said divider.

8. A system as claimed in claim 6, wherein said forming means comprises low-pass filters which have a cut-off frequency programmed by means of a control value calculated by the processor in conformity with the control value of the frequency of the generator.

9. A system as claimed in claim 5 further comprising a receiver comprising an audio signal modulator and a modulating signal generator, characterized in that the modulating signal generator of the receiver is programmable in frequency and in that the receiver comprises means for detecting the transmitted control signal and a processor for calculating, under the control of the detected control signal, a signal for determining the frequency of the modulating signal generator.

10. A system as claimed in claim 9, wherein said receiver further comprises low-pass filters which are of a type having an adjustable cut-off and/or rejection frequency and in that the processor of the receiver provides, under the control of the detected control signal, a signal for determining the cut-off and/or rejection frequency.

* * * * *